Figure 1:
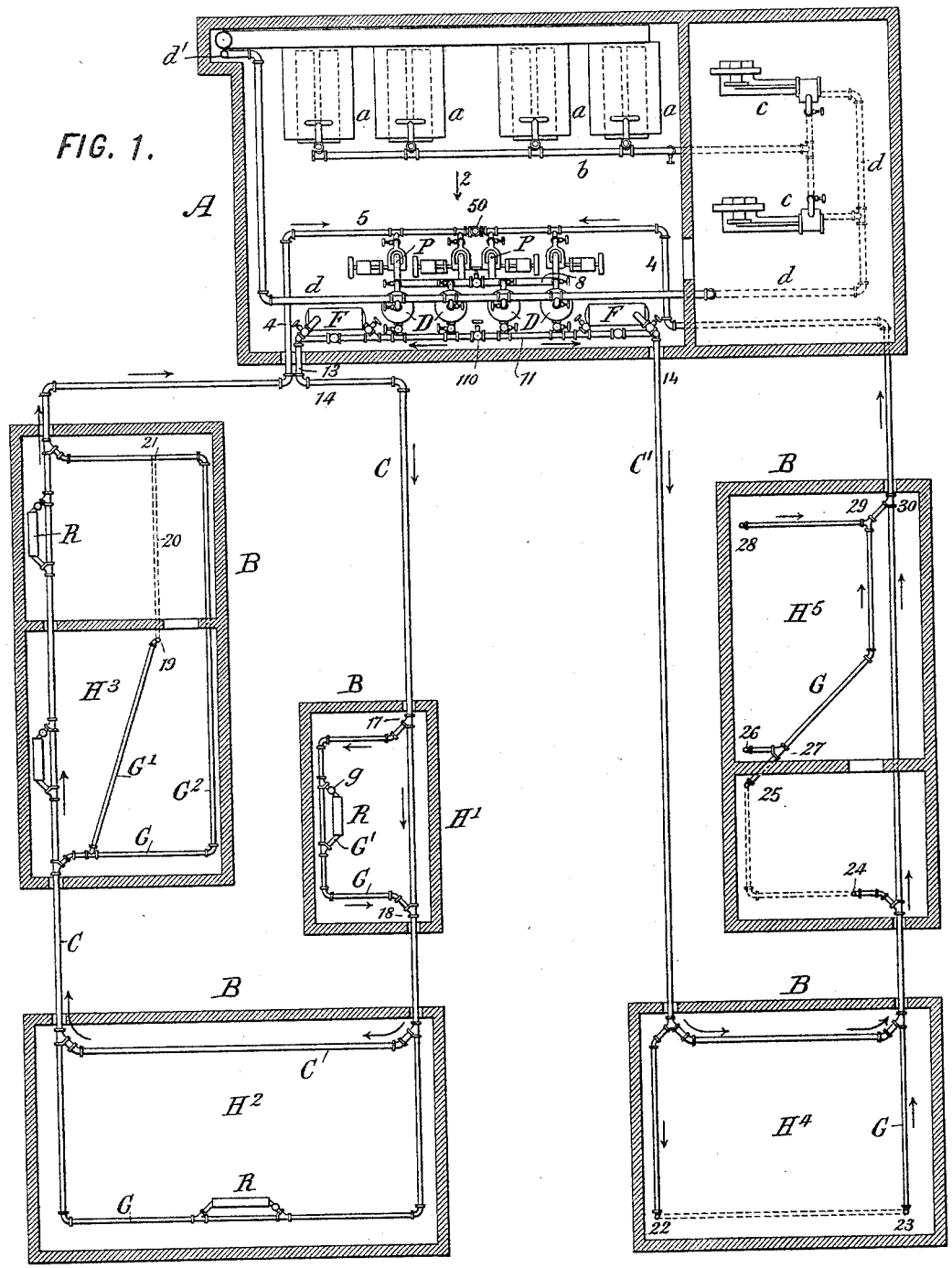

(No Model.) 3 Sheets—Sheet 1.

Q. N. EVANS.
HOT WATER SYSTEM FOR BUILDINGS.

No. 581,705. Patented May 4, 1897.

WITNESSES:
C. E. Ashley
H. W. Lloyd.

INVENTOR:
Quimby N. Evans,
By his Attorneys,
Arthur C. Fraser & Co.

(No Model.) 3 Sheets—Sheet 2.

Q. N. EVANS.
HOT WATER SYSTEM FOR BUILDINGS.

No. 581,705. Patented May 4, 1897.

WITNESSES:
C. E. Ashley
H. W. Lloyd

INVENTOR:
Quimby N. Evans,
By his Attorneys,
Arthur C. Fraser & Co

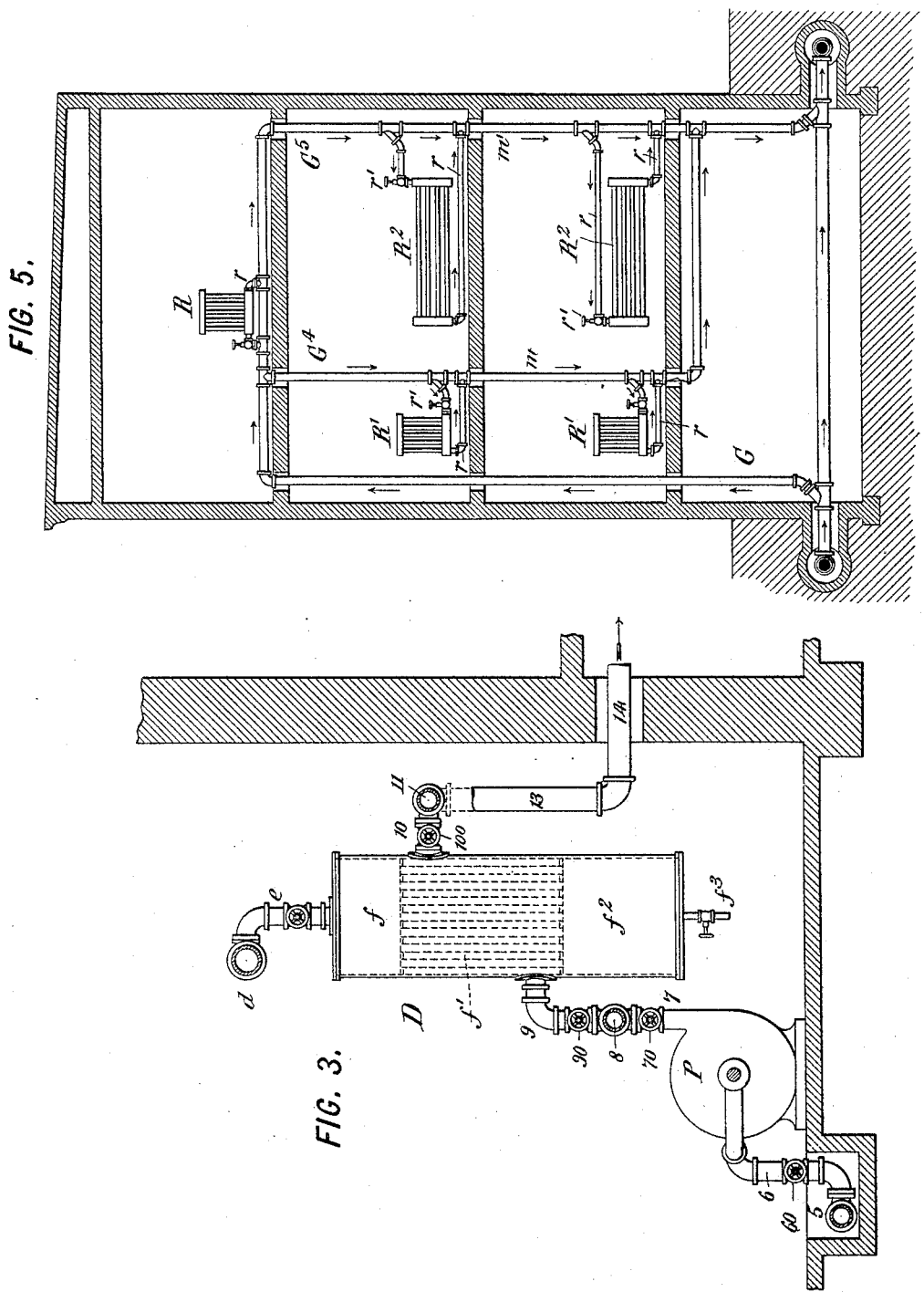

UNITED STATES PATENT OFFICE.

QUIMBY N. EVANS, OF BROOKLYN, NEW YORK.

HOT-WATER SYSTEM FOR BUILDINGS.

SPECIFICATION forming part of Letters Patent No. 581,705, dated May 4, 1897.

Application filed August 22, 1895. Serial No. 560,141. (No model.)

*To all whom it may concern:*

Be it known that I, QUIMBY N. EVANS, a citizen of the United States, residing in Brooklyn, in the county of Kings and State of New York, have invented certain new and useful Improvements in Hot-Water Heating Systems for Buildings, of which the following is a specification.

This invention relates to heating apparatus for buildings of that class in which hot water is circulated through pipes from a heater to the radiators, the partially-cooled water being returned and reheated, so that the water is kept in continuous circulation.

My present invention is applicable to the heating of one building or of several buildings located close enough together to be heated by one circuit.

My system requires the use of steam or other power for operating pumps to forcibly circulate the hot water, and is best adapted for use in connection with a steam-generating plant where the exhaust-steam from the engines may be utilized for heating the water of the heating-circuit, it being found that in many locations the heat ordinarily wasted in the exhaust-steam is sufficient, if properly utilized, to efficiently heat one or several buildings.

It is common in hot-water heating systems either to pass the entire body of hot water in series through the radiators or radiating-pipes of the system, as is commonly done in railway-car heaters, which involves the disadvantage that the successive radiators are successively lower in temperature and less efficient as heaters, or to divide the circuit into an outgoing or hot-water pipe and a return or cool-water pipe and connect the radiators between these two pipes, so that the water circulates through the radiators in parallel, a system which in the heating of buildings, and especially when much area is to be heated, involves an excessive amount of piping and numerous connections and fittings, which it is the aim of my invention to avoid.

My invention seeks to simplify hot-water heating systems without impairing their efficiency. To this end I inaugurate a rapid and powerful current of water through the circuit by means of force-pumps, and instead of introducing the radiators either in series on this circuit or in parallel between different branches of this circuit I introduce them in shunt with the main circuit—that is to say, the main circuit is a direct unobstructed circuit of large pipe containing no radiators and nothing to interrupt the direct flow of the water through it; but wherever it is desired to install one or several radiators a shunt-circuit of small pipe properly proportioned to the area to be heated is connected to the main circuit, so that a portion of the stream of water may be diverted through the shunt-circuit. The shunt-circuits may contain each one radiator, in which case the radiator will be arranged in series in the shunt, or they may contain numerous radiators, in which case the best arrangement and that provided by my invention is to connect each radiator in subshunt with the shunt-circuit. The water is diverted through the shunt-circuits at a rapid rate, although usually of less rapidity than in the main circuit, and gives up a small portion of its heat by radiation, the partly-cooled water being returned at the terminus of the shunt into the greater mass of water of the main circuit, thereby but slightly lowering the temperature of the latter by mixing therewith. Preferably each building, or it may be each floor of the building or each wing of a building, is heated by a separate shunt-circuit; and preferably each shunt-circuit is formed with an ascending pipe rising to the radiators for conveying the hottest water and with a descending pipe in which after the water has been slightly cooled by radiation it returns to rejoin the main circuit, the difference in specific gravity between the ascending and descending columns thereby facilitating the circulation through the shunt-circuit. It results from this system that the water in the main circuit, which is hot on leaving the heater, is slightly cooled at each of the shunts, but the proportion of water diverted through each shunt to the entire mass of water circulating through the main circuit is so small that the slight cooling of the water in each shunt reduces but little the temperature of the water in the main circuit by admixing therewith, so that when the last shunt of the series is reached the water is still hot enough to afford ample radiating capacity in the radiators on that shunt, and when the water finally returns to be reheated it has lost but a few degrees of heat, and not enough to render it ineffective as a heating medium. This result is due largely to the rapid circulation and the large body of water which is being circulated. My arrangement of shunts for installing the radiators avoids all necessity of duplicating or paralleling of circulating-pipes and reduces the piping for any given space to be heated to the minimum.

The accompanying drawings illustrate in detail one practical application of my invention.

Figure 4:
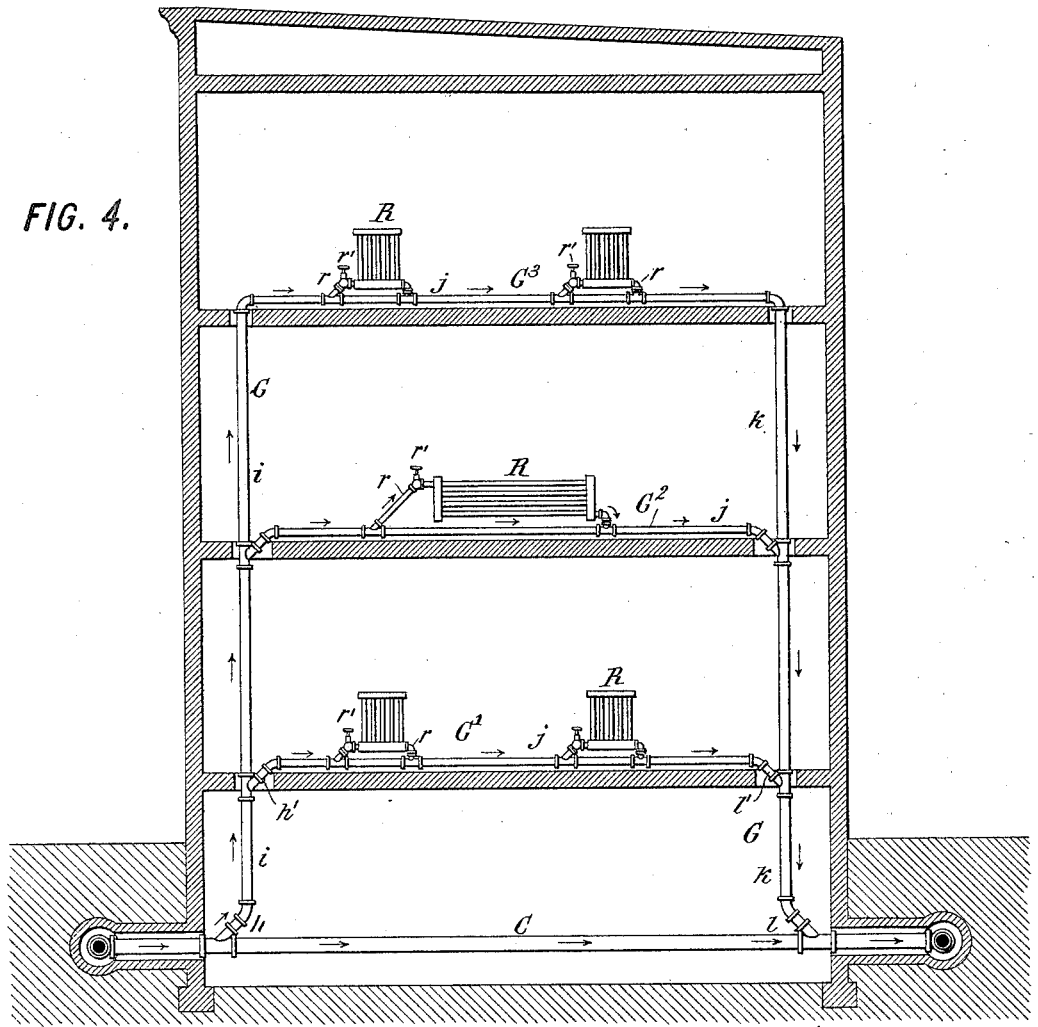
Figure 2:
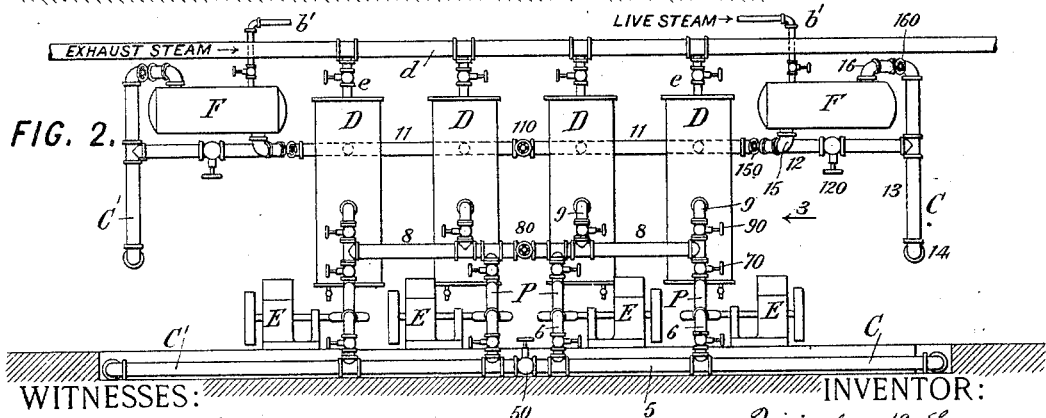

Figure 1 is a sectional plan view, on a reduced scale, showing a heating and water-circulating apparatus and two main water-circuits with their shunts, the one circuit heating two buildings and the other circuit three buildings. Fig. 2 is a front elevation, on a larger scale, of the pumping and heating apparatus shown in Fig. 1, looking in the direction of the arrow 2 in that figure. Fig. 3 is a sectional side elevation, on a still larger scale, of the same apparatus, viewed in the direction of arrow 3 in Fig. 2. Fig. 4 is a sectional elevation, on a larger scale than Fig. 1, showing the mode of distribution of water through a building to be heated. Fig. 5 is a similar sectional elevation showing a modified arrangement of piping.

Referring first to Fig. 1, let A designate a boiler and engine house or power-building, and B B designate neighboring buildings to be heated. C and C' are the two main water-circuits. In the particular application illustrated steam-boilers $a$ $a$ are shown, with a steam-pipe $b$ leading from them to steam-engines $c$ $c$ and an exhaust-pipe $d$ $d$ carrying the exhaust-steam from these engines and finally discharging it at $d'$ into an upright exhaust-pipe in the main stack. The exhaust-pipe $d$ passes, as shown in Fig. 2, over a series of heaters D D, and branch pipes $e$ $e$ are provided for diverting the exhaust-steam from the pipe $d$ into the respective heaters, each of these branch pipes being provided with a controlling-valve for closing it off.

The construction of the heaters is best shown in Fig. 3, the heaters here shown being constructed with an exhaust-steam chamber $f$ at top, a series of vertical tubes $f'$ leading thence downward, through which the exhaust-steam descends, and an exhaust-condensation chamber $f^2$ beneath, with a valved drip-pipe $f^3$ for discharging the water of condensation.

For convenience in describing the hot-water-circulating pipes I will designate the different portions thereof by numbers. Beginning with the return portion 4, Fig. 1, of either circuit C or C', (both circuits being identical in construction and arrangement within the power-house,) this pipe extends preferably underground and joins a longitudinal pipe or header 5. From this pipe branch pipes 6, Fig. 2, lead each to one of the pumps P. The pumps shown are centrifugal pumps driven at high speed by steam-engines E, one to each pump, (or they may be driven in any suitable way.) The pipe 6 is shown as branched and entering the pump P on both sides. From the discharge of pump P a valved pipe 7 leads into a longitudinal pipe or header 8. From the header 8 branch pipes 9 9 lead to the respective heaters D D. The pipe 9 enters the middle compartment of the heater, so that the hot water is discharged into the space around the tubes $f'$ and near the lower ends of the tubes, and the hot water circulates around the tubes and upwardly to the outlet of the heater which is near the upper end of the top compartment, and consists of a branch pipe 10, Fig. 3, leading into a horizontal pipe or header 11. This pipe is continuous by means of a pipe 12 with the pipe 13, Fig. 2, communicating with the outgoing section 14, Fig. 3.

For supplementing the heat of the exhaust-heaters in case of necessity, as, for example, in unusually cold weather, a live-steam heater F is provided for each circuit, consisting of a drum or shell through which the water circulates, entering it by a pipe 15, which branches from the pipe 11, and leaving it by a pipe 16, which joins the pipe 13, both these pipes having suitable valves. The live-steam pipe $b'$ admits steam direct from the boilers $a$ into the heater F.

For properly controlling the water in case of need the respective pipe-sections are provided with valves, those of section 6 being numbered 60, those of section 7 being numbered 70, those of section 9, 90, &c. Those of section 10 are numbered 100, that of section 12, 120, &c. When the auxiliary heater F is not in use, valves 150 and 160 are closed and valve 120 is open. In order to separate the circuit C from the circuit C', the pipes 5, 8, and 11 are provided, respectively, with middle valves 50, 80, and 110, which normally are closed, but which may be opened to throw the two circuits together in case of need.

The main circuits C C', whenever they are to be carried to any other building, are preferably conducted through suitable non-conducting conduits underground, substantially in the manner shown in Fig. 4. The main-circuit pipes will accordingly enter the cellars or basements of the respective buildings. In each building to be heated a shunt or loop of pipe is carried off from and returned back to the main circuit, these shunt-circuits being designated G G. The arrangement of the shunt-circuits differs according to circumstances—that is, according to the size and shape of the building, the particular location of the main-circuit pipes in the cellar or basement thereof, and other considerations. For example, the building marked H' has a simple shunt G, taken off from the main-circuit pipe C by a Y-fitting 17, extended around a single floor of the building and reëntering the main-circuit pipe by another Y-fitting 18. The use of a Y-fitting is preferable, as it serves to divert or divide a portion of the current from the main pipe into the shunt, and the course of the water being thus less abruptly changed than if a right-angle or T fitting were employed. At any convenient point in the shunt G is connected a radiator R. This radiator might be introduced directly in the shunt, but for purposes of regulation, especially when more than one radiator is to be connected, it is preferable to connect the radiator in the manner shown—that is to say, by introducing it in a subshunt G', through which sufficient water is diverted from the main shunt to set up a sufficient circulation in the radiator. The circulation of the water through this subshunt is controlled by a valve $g$. By closing this valve the circulation of water in the radiator which it governs is stopped, and this radiator will soon cool off, but this is done without interrupting the circulation through the shunt G. A similar arrangement of shunt G and radiator R is shown in the building marked $H^2$ in Fig. 1. Another arrangement where the shunt G is subdivided into two shunts G' and $G^2$ is shown in the building marked $H^3$. In this building the pipe 19 is extended to an upper story and passes across, as shown in dotted lines at 20, to the descending pipe 21. The same is done in the building marked $H^4$, where the shunt G has an ascending pipe 22 and a descending pipe 23. In the building marked $H^5$ the shunt G is extended into the upper stories by an ascending pipe 24, and in the upper story is subdivided and brought down by descending pipes 25 26, which unite into one branch by a Y-fitting 27, and by another descending pipe 28, which unites with the previous branches by a Y-fitting 29, and the reunited shunt finally rejoins the main circuit by a Y-fitting 30.

Fig. 4 shows the arrangement of the ascending and descending pipes of a shunt embodying the preferred construction according to my invention. The shunt G is taken off from the main circuit C by a Y-fitting $h$, from which leads an ascending pipe $i$, which may extend, as shown, to the top of the building, running thence horizontally as a pipe $j$, and then descending as a pipe $k$, and rejoining the main circuit by a Y-fitting $l$. To provide for installing the radiators on different floors of the building, the shunt is subdivided into as many subshunts as there are floors of the building, in this example three, which are lettered, respectively, G', $G^2$, and $G^3$. Each of these subshunts has a horizontal pipe-section $j$, and these pipe-sections diverge from and return to the respective upright pipes $i$ and $k$, preferably by Y-fittings $h'$ $l'$, respectively. The radiators R R are connected each in a secondary subshunt branching off from and returning to the horizontal pipes $j$ by means also preferably of Y-fittings, these secondary subshunts being lettered $r$ and their controlling-valves $r'$.

With an arrangement such as shown in Fig. 4 part of the hot water circulates directly through the main circuit C, while part is diverted through the ascending pipe $i$ of the main shunt and returned by the pipe $k$. Of the water thus diverted part passes off at the first fitting $h'$ into the first horizontal section $j$, another part continues on and goes through the second horizontal section $j$, and the remainder continues on and flows through the upper horizontal section $j$, these three streams being reunited in the descending pipe $k$. The water circulates thus whether any radiators are in use or not. The reasons for the circulation of the water through the shunts in preference to following entirely the more direct passage through the main circuit C are, first, that the shunt provides a second path for the flow of the water, thereby adding to the conductive area of the circuit C, and consequently between the terminals of the shunt, affording in conjunction with the intervening section of the circuit C less resistance to the flow than that afforded by the circuit C alone, so that the current tends to divide between the two paths in proportion inversely as their resistances, and, second, that the water flowing through the shunt or shunts radiates more or less of its heat, so that the descending column in the pipe $k$ is cooler than the ascending column in the pipe $i$, so that the difference in their specific gravities tends also to establish a circulation through the shunt.

To put any radiator into service, its valve $r'$ is opened, whereupon a portion of the water flowing through the horizontal section of pipe $j$ is diverted into the loop or secondary shunt $r$ and circulates through the radiator, returning again from the loop into the horizontal pipe. The reason for the indirect circulation of the water through the loop or secondary shunt and the radiator, instead of circulating directly through the horizontal pipe, is that the combined stream of water finds less resistance to its flow by circulating through the greater area afforded by both channels, and as the area in the radiator itself is greater than in the pipes the frictional resistance to circulation is much less, so that the natural tendency is for the greater portion of the water to flow through the radiator. Further, by placing the radiator above the horizontal section the partially-cooled water flowing from the radiator, having greater specific gravity than the water flowing to the radiator, tends to descend, and thereby augments the circulation. The radiators may be of any suitable construction, such as an unobstructed metallic box or shell, or a series of vertical pipes between a top and bottom header, or, as shown in the middle radiator in Fig. 4, a series of horizontal pipes between vertical end headers, or any other known construction of radiators may be used, it being apparent that those which are so constructed as to afford the freest and least restricted circulation of water are those which are adapted to give the best results.

The modification shown in Fig. 5 is introduced to show that the radiators need not necessarily be connected to horizontal reaches of pipe, but may be introduced into the vertical pipes of the shunt or shunts. In this figure the shunt G is divided into two sub-shunts $G^4$ and $G^5$, both having descending pipes $m$ and $m'$, to which the radiators $R'$ and $R^2$, respectively, are connected. Each radiator is connected in a loop or secondary shunt $r$, controlled by a valve $r'$, as already explained. The radiators $R'$ are shown as vertical radiators, the pipes of the loop or secondary shunt $r$ leading out of and returning to the vertical pipe $m$ at points closely adjacent to one another. The radiators $R^2$ are shown as horizontal radiators, the pipes of their loop or secondary shunt $r$ connecting with the vertical pipe $m'$ at points somewhat more widely separated. The causes of the diversion of water from the shunts into the radiators are the same with this construction as in that shown in Fig. 4.

While I have shown two main circuits C C', emanating both from one power-house or heating plant, yet I wish it understood that my invention is not confined to this arrangement, as either one of the circuits C or C' with its corresponding pumps and heaters may be omitted from the system, the remaining circuit with its pumps and heaters retaining all the essentials of my invention, broadly considered. The advantage of the duplication of the system is that it affords a greater range of adjustability for regulation of temperature and also provides more adequately against the getting out of repair of any of the elements of the apparatus. For example, if the two heaters D of the circuit C were both thrown out of service for any reason this circuit could be still supplied by opening the valves 50, 80, and 110, so as to utilize the heaters D of the other circuit to supply hot water to both circuits. Further, both the pumps of circuit C' might be disabled and yet both circuits could be supplied from the pumps of the circuit C by opening the valves 50 and 80. Yet the presence of these valves is desirable, because normally it is desirable to have the two circuits operate independently, so that the temperature of each circuit may be controlled irrespective of the other. For controlling the temperature one or more heaters D may be thrown into or out of service, and, if necessary, the heater F may be availed of. In ordinary winter weather both heaters D D will be in use, receiving exhaust-steam and having water circulating through them. In milder weather or whenever it is found that the temperature of the water returning through the circuit is above the normal one of the heaters D may be disconnected by closing the valves 90 and 100, connecting therewith, and closing the exhaust-steam valve in the upper pipe $e$. In excessively cold weather, when both heaters are inadequate to keep up the temperature of the circulating water, so that it returns at too low a temperature, the live-steam heater F is brought into use by opening the valves 150 and 160 and more or less closing the valve 120, so as to divert more or less of the flow of water through the heater F, and at the same time opening the valve in the live-steam pipe $b'$. By this means the system may be so controlled that under all weather conditions just as many heat units may be restored to the circulating water as have been abstracted from it during its passage around the heating-circuit. The rapidity of circulation may be determined by varying the speed of the pumps P P, or either pump may be cut out of service by closing the valves 60 70, communicating therewith, thereby leaving the other pump alone to effect the circulation. Centrifugal pumps are preferable, but other known types of pumps may be substituted.

My invention is susceptible of considerable modification in matters of proportion and of detail without departing from its essential features. A single circuit with a single heater and pump and with a single shunt supplying a single radiator would be within my invention in its broadest aspects. The number of heaters and the number of circulating-pumps may be varied according to the requirements of different individual installations. Where exhaust-steam is not available, live steam or other source of heat may be substituted, as by employing water-heaters heated by direct combustion, as in a furnace, (ordinary Baker car-heaters being examples thereof,) or by carrying a coil of water-pipe through the stack of a furnace to utilize the heat otherwise wasted through the chimney; but I prefer to use exhaust-steam by reason both of its economy and its convenience.

I make no claim to the forcible circulation of water through a heater and thence over a circuit, nor to the employment of a service-heater for heating by exhaust-steam and an auxiliary or emergency heater for heating by live steam, as both these features are illustrated in my Patent No. 471,351, dated March 22, 1892.

I claim as my invention the following-defined novel features, substantially as hereinbefore specified, namely:

1. A heating system comprising a hot-water circuit of pipes, a water-heater for heating the water in said circuit, a pump for forcibly and rapidly circulating the water through said circuit, a shunt branching from said circuit and returning thereinto, and radiators shunted from and with their returns reëntering said shunt, whereby the water partially cooled by radiation returns from said shunt to mix with the hot water circulating through said circuit.

2. A heating system comprising a hot-water circuit of pipes, a water-heater for heating the water in said circuit, a pump for forcibly and rapidly circulating the water through said circuit, a succession of shunts branching from said circuit and returning thereinto, and radiators shunted from and with their returns reëntering said shunts, whereby the partially-cooled water in each shunt is returned into and mixed with the hot water circulating through said circuit and whereby any radiator may be shut off from its shunt and any shunt may be cut off from the circuit without interfering with the circulation.

3. A heating system comprising a hot-water circuit of pipes, a water-heater for heating the water in said circuit, a pump for forcibly and rapidly circulating the water through said circuit, a shunt branching from said circuit and subdivided into subshunts, radiators included in said subshunts, said subshunts reunited to said shunt, and the return-pipe of said shunt reëntering said circuit to return the partially-cooled water from the subshunts to mix with the hot water circulating through said circuit.

4. A heating system comprising a hot-water circuit of pipes, a water-heater for heating the water in said circuit, a pump for forcibly and rapidly circulating the water through said circuit, a shunt branching from said circuit and formed with an ascending pipe, and radiators shunted from and with their returns reëntering said shunt, and said shunt formed with a descending return-pipe leading from said radiators to the main circuit.

5. A heating system comprising a hot-water circuit of large pipes, a plurality of water-heaters in parallel branches of said circuit for heating the water therein, valves for controlling said branches whereby either heater may be cut out of circuit, a pump for forcibly and rapidly circulating the water through said circuit, and a series of shunts branching from and returning to said circuit, with radiators included in said shunts.

6. A heating system comprising a hot-water circuit of large pipes, a plurality of water-heaters in parallel branches of said circuit for heating the water therein, valves for controlling said branches whereby either heater may be cut out of circuit, a plurality of pumps for forcibly and rapidly circulating the water through said circuit, connected in parallel branches thereof, with valves in said branches for controlling the flow therethrough, whereby either pump may be cut out of service, and a series of shunts branching from said circuit and returning thereto, with radiators included in said shunts.

In witness whereof I have hereunto signed my name in the presence of two subscribing witnesses.

QUIMBY N. EVANS.

Witnesses:
ARTHUR C. FRASER,
GEORGE H. FRASER.